Feb. 12, 1946.  H. W. STRAAT  2,394,949
REFRACTOMETER
Filed July 1, 1943
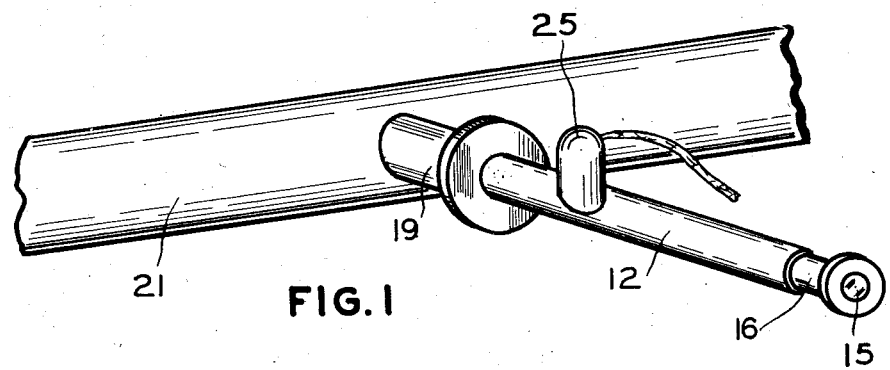
FIG. 1
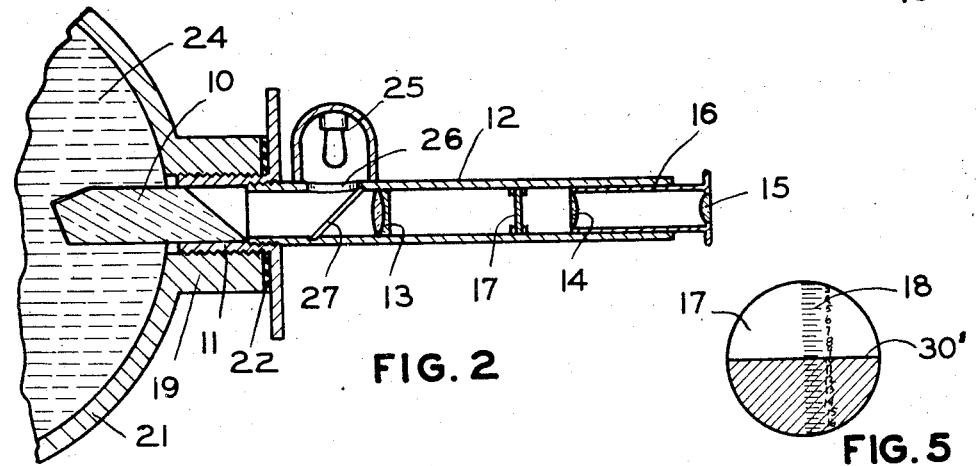
FIG. 2
FIG. 5
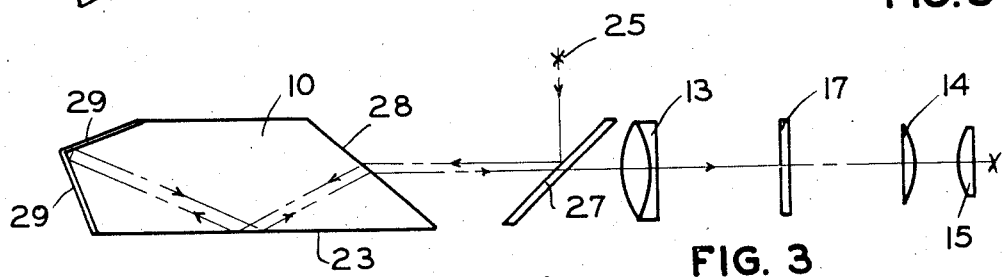
FIG. 3
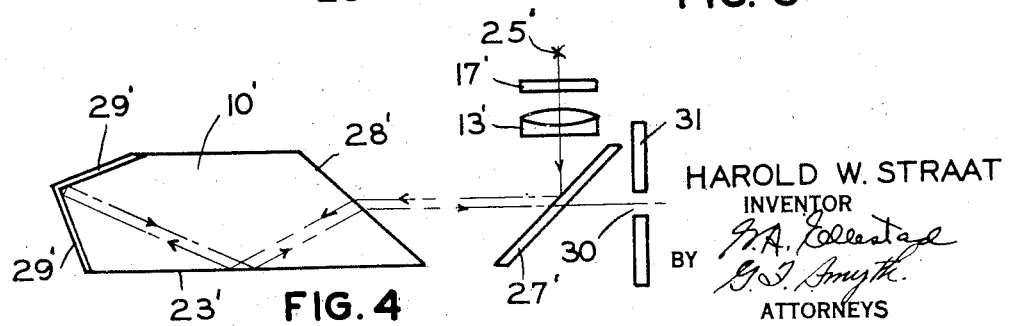
FIG. 4
HAROLD W. STRAAT
INVENTOR
BY
ATTORNEYS Patented Feb. 12, 1946

2,394,949

UNITED STATES PATENT OFFICE 2,394,949

REFRACTOMETER

Harold W. Straat, Irondequoit, N. Y., assignor to Bausch & Lomb Optical Company, Rochester, N. Y., a corporation of New York Application July 1, 1943, Serial No. 493,011

7 Claims. (Cl. 88—14)

This invention relates to optical measuring instruments and more particularly to an instrument for measuring the refractive index of a liquid.

It is well known that the light refracting power of liquids may be used to ascertain many properties of liquids and refractometers today are widely used throughout many industries. Generally, the refractometers are those in which the measurement is effected by the boundary line established by the critical angle at a prism surface in contact with the liquid undergoing measurement.

In reflecting types of instruments, internal light rays incident on the reflecting surface of the prism at angles less than the critical angle are commonly considered to pass into the liquid and hence lost. It can be shown by Fresnel's law, however, that a part of this incident light is reflected and illuminates the dark field of a reflecting type of refractometer. This reflected light decreases the contrast between the light and dark fields of such instruments and the boundary line between the fields may not be distinct and this often renders refractometers of the total reflecting type difficult to use.

In the instrument of the present invention, the contrast between the two fields is much greater than in instruments heretofore proposed, for all light rays reflected by the reflecting surface of the prism are directed back to the reflecting surface at angles of incidence substantially equal to the angles of incidence at the first reflection by the surface. Thus the light rays incident on the reflecting surface at angles less than the critical angle and reflected by the surface are twice refracted. Although some of these rays will be reflected into the viewing means of the instrument, the portion reflected is small as compared with that refracted. The loss of the rays refracted greatly decreases the amount of light reflected into the dark field of the viewing means of the instrument and, as the light reflected into the light field is not diminished, the contrast between the two fields is greatly increased.

Other features and advantages of the instrument of the present invention will be apparent from the following description taken in connection with the accompanying drawing in which:

Fig. 1 is a perspective view of the instrument of the present invention mounted on a conduit.

Fig. 2 is a vertical section of the mounted instrument shown in Fig. 1.

Fig. 3 is a schematic view of the optical system of the instrument of the present invention.

Fig. 4 is a view similar to Fig. 3 but showing a modified optical system.

Fig. 5 is a schematic view illustrating the field of the prism as seen in the viewing means of the instrument of the present invention.

The instrument of the present invention, referring now to the drawing, although shown as mounted to a conduit through which the liquid to be tested is flowing, may be just as effectively used as a dipping refractometer, or one used for measuring the index of refraction of a liquid held by a storage container.

In the illustrated embodiment of the instrument, an end of a prism 10 is mounted in the bore of a holder 11 and extends beyond the one end face of the same. A viewing means, such as the telescope 12, has one end thereof secured to the holder 11 in such a way that the bore of the telescope forms a continuation of the bore of the holder 11.

In the embodiment of the invention now preferred, the telescope 12 comprises an objective lens 13 and an eyepiece lens system consisting of a collective lens 14 and an eyelens 15 mounted in an ocular tube 16. A transparent plate 17 transversely mounted in the body of the telescope 12 carries a suitable scale visible through the eyepiece as shown at 18 in Fig. 5. The plate 17 is mounted so that the scale carried thereby lies in a plane substantially coincident with the focal plane of the objective lens 13. The tube 16 is movable axially of the body of the telescope 12 so that the instrument may be focused.

In the use of the instrument as illustrated in Fig. 1, the holder 11 is shown as threaded into a bushing 19 integral with the wall of the conduit 21. A suitable gasket 22 interposed between the end face of the bushing 19 and a flange of the holder 11 seals the joint therebetween. When the holder 11 is so mounted, the surface 23 of the prism 10 is in contact with a liquid 24 flowing through the conduit.

A light source 25 is mounted on the telescope 12 in alignment with an aperture 26 formed therein. A semi-transparent reflector plate 27 obliquely mounted within the telescope 12 beneath the aperture directs light from the source to an entrance face 28 of the prism 10. The light rays directed to the prism are refracted by the material of the same and a portion of the rays is incident on the reflecting surface 23 of the prism. Those light rays which are incident on the reflecting surface 23 at angles greater than the critical angle will be totally reflected while light rays striking the surface 23 at angles less than the critical angle will be refracted into the liquid 24. Although light rays incident on the reflecting surface 23 at angles less than the critical angle are commonly considered to be refracted and lost in the liquid, actually a part of this incident light is reflected by the surface 23 as can be demonstrated by Fresnel's law.

In instruments heretofore proposed, this reflected light decreased the contrast between the light and dark fields of the instrument and oftentimes the instrument was difficult to use. The contrast between the two fields of the instrument of the present invention is much greater than in the instruments heretofore proposed, for all light rays reflected by the surface 23 are directed to a system of reflecting faces so constructed and arranged that light rays reflected into the system are returned by the system to the surface 23 at angles of incidence substantially equal to the angles of incidence at the first reflection by the surface 23. Although any system of reflecting faces can be used which will so return the light rays reflected by the surface 23, in the form of the invention now preferred, the system comprises a pair of reflecting faces 29 accurately formed so as to be normal to each other and filmed to render the same opaque.

As the pair of reflecting faces 29 will return reflected light rays to the surface 23 so that they will again be incident on the surface 23 at substantially the same angles of incidence as at the first reflection, light rays incident on the face 23 at angles less than the critical angle will in most part be refracted into the liquid. Thus as most of these light rays are lost, they cannot illuminate the dark field of the instrument and as light rays illuminating the light field are completely reflected, the contrast between the two fields is greatly enhanced.

The magnitude of the contrast can be mathematically shown, for if it is assumed that the prism has a refractive index of 1.75 and the liquid being measured has an index of 1.45, 7.19% of light incident on the surface 23 at an angle of 50°, which is less than the critical angle, will be reflected by the surface. In refractometers heretofore proposed, the 7.19% of the light was reflected into the observing telescope of the instrument and illuminated the dark field of the same. In the instrument of the present invention, due to the reflecting faces 29, the reflected light is redirected to the surface 23 where again 92.81% of the light is refracted. Thus but 7.19% of the portion of the light reflected at the first reflection or 0.52% of the light can be seen in the dark field of the instrument.

It will thus be seen that the contrast between the two fields will be considerably greater in the instrument of the present invention than in those previously proposed. This makes the instrument not only easier to use but more accurate in that the boundary line 30' between the two fields establishes a well-defined index mark for use with the scale, as clearly shown in Fig. 5.

The angular relationship between the face 28 and the surface 23 will be determined by the material of the prism and the refractive index of the liquid undergoing examination. The light used will also affect this relationship and in the illustrated embodiment of the invention, the face 28 has been so formed relative to the surface 23 that white light can be used without dispersion of the emerging light.

In a modified form of the instrument, the optical system of which is schematically shown in Fig. 4, the transparent plate 17' and the objective 13' are mounted between the light source 25' and the semi-transparent reflective plate 27'. Thus it will be seen that the light will enter the prism 10' through the entrance 28' in the identical manner as light entered the prism 10 of the form of the invention first described. The light incident on the reflecting surface 23' of the prism 10' is passed into the prism and out of the system in the identical manner as has been described in connection with the form of the invention shown in Figs. 1 to 3. In the modified form of the invention, however, the observer views the field of the prism through an aperture 30 formed in a diaphragm 31.

As the light rays enter and leave the prism of both forms of the invention by means of the same face, the instrument can be mounted and effectively used in many applications where refractometers of the type in which the light rays are passed through the liquid undergoing test cannot be used. The instrument is also very easily installed, for all that is necessary is an opening in the conduit or container of a size sufficient to allow the prism to project into the interior of the same and a suitable seal about the opening to prevent the escape of liquids therethrough.

It will also be obvious that the instrument herein described can be used as a dipping refractometer, for it is self-contained and may be used as such an instrument by merely submerging the prism in the liquid whose light refracting power is to be measured. Furthermore, as all refractometers of the type described actually measure the angle between the normal to the exit face of the prism and the boundary edge of the shadow produced by the liquid being measured and which varies with the critical angle, it is obvious that means other than that described herein can be used to measure that angular relationship. Thus, while I have illustrated the preferred embodiments of the instrument in the present invention, it is to be understood that the invention is not to be limited to the embodiments illustrated and described but is susceptible to changes in form and detail within the scope of the appended claims.

I claim:

1. A refractometer comprising a prism, means for directing light rays into the prism, said prism having a reflecting face adapted to be placed in contact with the specimen to be tested and a pair of reflecting faces normal to each other positioned to receive rays reflected by said face and redirect such rays back to said face at an angle of incidence substantially the same as the angle of incidence at the first reflection of the rays by said face, means for forming an image of the boundary edge of the shadow produced by the specimen, scale means, means for producing an image of the scale means extending transversely of the boundary edge, and means for viewing the two images.

2. A refractometer comprising a prism having an entrance face, a first reflecting face and a pair of reflecting faces normal to each other, means for directing light rays through the entrance face and onto said first reflecting face and thence to the pair of faces, back to the first reflecting face and out through the entrance face, said first reflecting face being adapted to be placed in contact with the sample to be tested, scale means, means for forming an image of the scale means transversely of the boundary edge of the shadow produced by the sample, and means for viewing the image and the boundary edge of said shadow.

3. A refractometer comprising a prism having a face adapted to be placed in contact with the material to be tested, said face adapted to totally reflect light rays entering said prism through an end face thereof, said prism having a system of reflecting faces at the other end thereof for reversing the path of light rays reflected by said face and redirecting the rays onto said face at an angle of incidence substantially equal to the angle of incidence of the rays at the first reflection thereof by said face, scale means positioned transversely of the path of rays leaving said prism, lens means for forming transversely of the scale means an image of the boundary edge of the shadow produced by the material to be tested, and an eyepiece for viewing said image and scale means.

4. A refractometer comprising a prism, means for directing light rays into the prism, said prism having an entrance face, a first reflecting face and a pair of reflecting faces normal to each other whereby light rays passing through the entrance face are reflected by said first reflecting surface to the pair of faces and thence redirected to the first reflecting face and reflected out through the entrance face, the first reflecting face being adapted to be placed in contact with the sample to be tested, scale means positioned across the path of rays leaving the entrance face, means for forming on the scale means an image of the boundary edge of the shadow produced by the sample and means for viewing the scale means and shadow image.

5. A refractometer comprising a casing, a prism carried at one end of the casing and projecting outwardly therefrom, an ocular carried by the other end of the casing in alignment with the prism, a light source carried by the casing and positioned laterally of the axis thereof, a semi-transparent reflector positioned transversely of said axis and opposite said source for reflecting light rays into the prism from the source, scale means positioned between the ocular and the reflector, said prism having a reflecting face adapted to contact the material to be tested and having a pair of reflecting faces normal to each other for receiving reflected rays from said face and redirecting them back to said face at angles of incidence substantially equal to the angle of incidence of the rays at the first reflection thereof by the face, lens means positioned between the reflector and ocular for receiving light rays passing through the reflector from the prism and forming at the scale means an image of the boundary edge of the shadow produced by the material, the image of the boundary edge being transverse to the axis of the scale means, whereby the image and scale means may be viewed by the ocular.

6. A refractometer comprising a prism, viewing means positioned in alignment with the prism, a semi-transparent reflector positioned between the viewing means and prism, a light source positioned laterally of said reflector whereby light rays from the source may be directed into the prism by the reflector, said prism having a reflecting face adapted to be placed in contact with the material to be tested, and a system of reflecting faces constructed and arranged to receive rays reflected by said face and redirect them back to said face at angles of incidence substantially equal to the angles of incidence of the rays at the first reflection thereof by said face and thence out of the prism and through the reflector, scale means between the source and the reflector, lens means between the scale means and reflector for forming an image of said scale means extending transversely of the boundary edge of the shadow formed by the material whereby the boundary edge and scale means may be observed by the viewing means.

7. A refractometer comprising a housing, a prism projecting from the housing, a light source, said prism having an entrance face, a first reflecting face adapted to be placed in contact with the specimen to be tested, and a pair of mutually normal reflecting faces, means for directing light rays from said source through said entrance face to the first reflecting face, thence to the pair of faces, back to said first reflecting face and out through said entrance face, scale means, means for forming an image of the scale means transversely of the boundary edge of the shadow produced by the specimen, means for forming an image of the boundary edge and the superposed image of the scale means and means for viewing the image.

HAROLD W. STRAAT.